United States Patent [19]

Talley

[11] Patent Number: 5,789,361
[45] Date of Patent: *Aug. 4, 1998

[54] NON-CAUSTIC CLEANING COMPOSITION COMPRISING PEROXYGEN COMPOUND AND SPECIFIC SILICATE, AND METHOD OF MAKING SAME IN FREE-FLOWING, PARTICULATE FORM

[75] Inventor: Charles Bullick Talley, Highlands Ranch, Colo.

[73] Assignee: Charvid Limited Liability Co., Highlands Ranch, Colo.

[*] Notice: The term of this patent shall not extend beyond the expiration date of Pat. No. 5,663,132.

[21] Appl. No.: 609,565

[22] Filed: Mar. 1, 1996

Related U.S. Application Data

[63] Continuation-in-part of Ser. No. 396,971, Mar. 1, 1995, Pat. No. 5,663,132.

[51] Int. Cl.$^6$ .................. C11D 11/00; C11D 7/14; C11D 7/18; C11D 17/00

[52] U.S. Cl. .................. 510/218; 510/197; 510/219; 510/234; 510/238; 510/243; 510/244; 510/245; 510/254; 510/362; 510/365; 510/375; 510/378; 510/438; 510/441; 510/442; 510/511

[58] Field of Search .................. 510/197, 218, 510/219, 234, 238, 243, 244, 245, 254, 362, 365, 372, 375, 378, 405, 434, 436, 511, 438, 441, 442

[56] References Cited

U.S. PATENT DOCUMENTS

| | | | |
|---|---|---|---|
| 2,817,606 | 12/1957 | Barrett | 134/22 |
| 3,764,542 | 10/1973 | Natali et al. | 510/530 |
| 3,843,633 | 10/1974 | Weber | 252/543 |
| 3,901,819 | 8/1975 | Nagakawa et al. | 252/186 |
| 3,920,570 | 11/1975 | Mulders | 252/89 |
| 3,960,665 | 6/1976 | Villadsen et al. | 195/66 R |
| 3,968,047 | 7/1976 | Smeets | 252/95 |
| 3,982,892 | 9/1976 | Gray | 8/111 |
| 4,003,700 | 1/1977 | Gray et al. | 8/111 |
| 4,016,090 | 4/1977 | Nakagawa et al. | 252/102 |
| 4,028,282 | 6/1977 | Okumma et al. | 252/537 |
| 4,115,293 | 9/1978 | Schoenholz et al. | 252/102 |
| 4,196,093 | 4/1980 | Clarke et al. | 510/317 |
| 4,231,890 | 11/1980 | Yagi et al. | 252/186 |
| 4,279,769 | 7/1981 | Yagi et al. | 252/186 |
| 4,289,643 | 9/1981 | Joubert | 510/233 |
| 4,326,976 | 4/1982 | Logan et al. | 252/99 |
| 4,347,168 | 8/1982 | Murphy et al. | 252/547 |
| 4,374,474 | 2/1983 | Tai | 252/186.26 |
| 4,476,161 | 10/1984 | Potschke | 8/543 |
| 4,518,516 | 5/1985 | Godard et al. | 510/220 |
| 4,615,820 | 10/1986 | Hepworth et al. | 252/139 |
| 4,619,779 | 10/1986 | Hardy | 252/91 |
| 4,655,953 | 4/1987 | Oakes | 252/99 |
| 4,761,161 | 8/1988 | Pötschke | 252/89.1 |
| 4,772,413 | 9/1988 | Massaux et al. | 252/102 |
| 4,795,584 | 1/1989 | Ross et al. | 252/174.23 |
| 4,820,440 | 4/1989 | Hemm et al. | 252/135 |
| 4,832,862 | 5/1989 | Joubert et al. | 510/230 |
| 4,876,023 | 10/1989 | Dickenson et al. | 252/90 |
| 4,933,103 | 6/1990 | Aoyagi et al. | 252/186.38 |
| 5,041,232 | 8/1991 | Batal et al. | 252/94 |
| 5,045,223 | 9/1991 | Batal et al. | 252/102 |
| 5,078,895 | 1/1992 | Dany et al. | 252/94 |
| 5,093,021 | 3/1992 | Coyne et al. | 252/91 |
| 5,167,854 | 12/1992 | Deleeuw et al. | 252/186.27 |
| 5,292,443 | 3/1994 | Esche, Jr. et al. | 252/42.7 |
| 5,292,446 | 3/1994 | Painter et al. | 510/381 |
| 5,340,496 | 8/1994 | Sato et al. | 252/186.27 |
| 5,360,568 | 11/1994 | Madison et al. | 252/102 |
| 5,370,826 | 12/1994 | Madison et al. | 252/102 |
| 5,456,850 | 10/1995 | Trabitzch et al. | 510/303 |
| 5,462,804 | 10/1995 | Kokubu et al. | 428/402.24 |
| 5,496,495 | 3/1996 | Beck et al. | 252/174.23 |

FOREIGN PATENT DOCUMENTS 673 033 A5  1/1990  Switzerland.

OTHER PUBLICATIONS

Chem. abstr., vol. 116, No. 4, 27 Jan. 1992 (Columbus,OH, USA), p. 139, col. 2, the abstract No. 23442y, Kruse et al., 'Stable bifunctional phosphate–free detergent tablets for use in mechanical dishwashers.' Ger. Offen. DE 4,010,524, 10 Oct. 1991.

*Primary Examiner*—Ardith Hertzog
*Attorney, Agent, or Firm*—Douglas W. Swartz; Michael L. Tompkins; Sheridan Ross P.C.

[57] ABSTRACT

The present invention discloses an alkaline cleaning composition for cleaning heavily soiled metal surfaces such as food fryers, baking pans, high temperature pasteurizers, and beer kettles, ceramic surfaces such as restaurant grade ceramic china plates and platters, and plastic surfaces. The cleaning composition is noncaustic and includes a peroxygen compound, a chelate, and a metasilicate and/or sesquisilicate. A preferred cleaning composition further includes a surfactant and hydrated builder.

28 Claims, No Drawings

NON-CAUSTIC CLEANING COMPOSITION COMPRISING PEROXYGEN COMPOUND AND SPECIFIC SILICATE, AND METHOD OF MAKING SAME IN FREE-FLOWING, PARTICULATE FORM

CROSS-REFERENCE TO RELATED APPLICATIONS

The present application is a continuation-in-part of U.S. patent application Ser. No. 08/396,971, filed Mar. 1, 1995, now U.S. Pat. No. 5,663,132, which is incorporated herein in its entirety.

FIELD OF THE INVENTION

This invention relates generally to a cleaning composition and more specifically to an alkaline cleaning composition for removing protein, grease and other organic deposits and stains from articles such as those used in the food industry.

BACKGROUND OF THE INVENTION

In the food processing industry, the cleaning of equipment is a significant problem. In many applications, the high temperatures employed cause difficult-to-remove organic deposits, such as baked-on carbon and hydrolyzed protein, to form on the equipment. In the dairy industry, for example, the pasteurizing equipment is heated to temperatures in excess of 160° F. to sterilize dairy products. At such temperatures, a blue-black organic deposit, that is very difficult to remove with known cleaners, commonly forms on the equipment.

Caustic cleaners are commonly used to remove organic deposits but caustic cleaners are unsafe and require substantially elevated temperatures to work effectively and are extremely difficult to remove by rinsing. Many caustic cleaners, such as those incorporating sodium hydroxide, are corrosive to skin and produce hazardous fumes. Such caustic cleaners can also corrode or scar metal (e.g., aluminum and brass), and destroy many types of floor, wall and countertop surfaces. For instance, sodium hydroxide should not be used on aluminum since reactions will occur which are corrosive to the metal. At temperatures in excess of 160° F., which are normally required to remove organic deposits, caustic cleaners can consume oxygen. In tanks and other types of substantially closed vessels, the consumption of oxygen can cause a decrease in the internal pressure of the vessel leading to vessel collapse. To remove the caustic cleaners, an elaborate set of steps is followed, typically requiring high temperatures and neutralization.

To avoid the problems associated with caustic cleaners, noncaustic cleaners, which are typically not as effective as caustic cleaners, are employed in many applications. Because of the reduced effectiveness of the noncaustic cleaners, additional time and labor is required to remove stubborn organic deposits. Noncaustic cleaners are sometimes initially used to remove a portion of the organic deposits with the remainder being removed by caustic cleaners. In this manner, the use of caustic cleaners is reduced as much as possible.

There is a need for a non-hazardous cleaner for removing organic deposits, such as those encountered in the food industry, that is safe to use and will not damage the surfaces to be cleaned. Particularly, there is a need to provide a cleaner that is noncorrosive to skin and the surfaces to be cleaned and that will not consume oxygen at high temperatures.

There is a further need to provide a cleaner that is capable of removing organic deposits at relatively low temperatures.

There is a further need for an all purpose cleaner having a wide range of applications, including the removal of organic deposits from deep fat fryers or bakery pans, to replace caustic and noncaustic cleaners.

SUMMARY OF THE INVENTION

The present invention addresses these and other needs by providing a cleaning composition which includes at least a peroxygen compound, a metasilicate or sesquisilicate, and a chelate. The cleaning composition is typically in a dry or granulated state and can be combined with a suitable carrier, typically water, to form a cleaning solution.

The peroxygen compound is preferably a perborate or a percarbonate and more preferably a percarbonate. The perborate or percarbonate preferably is complexed with a metal such as sodium, lithium, calcium, potassium or boron. The preferred amount of the peroxygen compound in the cleaning composition, when in the dry or granular state, is at least about 25% by weight and more preferably ranges from about 25% to about 40% by weight of the cleaning composition.

The metasilicate and sesquisilicate are preferably anhydrous. The preferred amount of the metasilicate and/or sesquisilicate in the cleaning composition, when in the dry or granular state, is at least about 15% by weight and more preferably ranges from about 15% to about 40% by weight of the cleaning composition.

The chelate is preferably a derivative of a carboxylic or phosphonic acid. More preferably, the chelate is selected from the group consisting of ethylenediaminetetraacetic acid ("EDTA"), N-hydroxyethylenediaminetriacetic acid ("NTA"), and poly(alkylphosphonic acid). The preferred amount of the chelate in the cleaning composition, when in the dry or granular state, is at least about 2% by weight and more preferably ranges from about 2% to about 8% by weight of the cleaning composition.

In one embodiment, the peroxygen compound, metasilicate and chelate are all salts having the same cation. The preferred cation is sodium or potassium.

The composition can include a builder. The builder is preferably a carbonate, sulfate, phosphate, or mixture thereof. The carbonate is preferably at least one of the following compounds: a sodium carbonate (e.g., soda ash), sodium sesquicarbonate, or sodium bicarbonate. The sulfate is preferably sodium sulfate. The phosphate is preferably at least one of the following compounds: a tripolyphosphate, trisodium polyphosphate, sodium potassium pyrophosphate, sodium hexametaphosphate, disodium phosphate, monosodium phosphate. The carbonate and phosphate are preferably in the hydrated form. The preferred amount of the builder in the cleaning composition, when in the dry or granular state, is from about 15% to about 75% by weight of the cleaning composition.

The ratios of the various components are important in many applications. The preferred weight ratio of the peroxygen compound to the chelate ranges from about 7:1 to 3:1. The preferred weight ratio of the metasilicate and sesquisilicate to the surfactant ranges from about 5:1 to about 15:1.

The cleaning composition can include a surfactant to act as a wetting agent, emulsifying agent, and/or dispersing agent. The preferred amount of the surfactant in the cleaning composition, when in the dry or granular state, ranges from about 2.5% to about 5% by weight of the cleaning composition.

The cleaning composition can include a gelling agent for adhering the cleaning composition to a desired surface. Preferred gelling agents include carboxymethylcellulose, hydroxymethylcellulose and modified polyacrylamide. The preferred amount of the gelling agents in the cleaning composition, when in the dry or granular state, ranges from about 5% to about 10% by weight of the cleaning composition.

As noted above, the cleaning composition can be combined with water to form a cleaning solution. The cleaning solution preferably contains from about 92% to about 99% water by weight with the remainder constituting the cleaning composition. The pH of the cleaning solution preferably ranges from about pH 9 to about pH 12.

In another embodiment of the subject invention, the cleaning composition includes (a) a peroxygen compound; (b) at least about 15% by weight of a metasilicate and/or sesquisilicate; and (c) a chelate that is at least one of a carboxylic acid, phosphonic acid and salt thereof. The peroxygen compound, metasilicate and chelate can be salts having the same cation. The cleaning composition can further include a surfactant and a builder as described above. In yet another embodiment of the present invention, a method for cleaning an object is provided including the steps of: (i) applying a cleaning solution to the object wherein the cleaning solution includes (a) at least about 25% by weight of a percarbonate compound; (b) at least one of a metasilicate and sesquisilicate; (c) a builder including at least one of the following: a sulfate, phosphate, and a carbonate; and (d) a chelate; and (ii) removing the cleaning solution from the object. The object can be composed of a broad variety of materials, including a metal, such as brass, stainless steel, aluminum, or a ceramic or plastic material.

The method can further include one or more of the following steps: (i) soaking the object in the cleaning solution at a temperature less than about 190° F.; (ii) spraying the object with the cleaning solution at a temperature of less than about 100° F.; (iii) circulating the cleaning solution about the object at a temperature less than about 190° F.; and/or (iv) rinsing the object with water to remove the cleaning solution.

In many applications, the cleaning composition of the present invention is significantly more effective and safer than caustic cleaners in removing organic deposits. The cleaning composition can generally be used effectively at temperatures lower than the temperatures at which caustic cleaners are used. It is believed that, depending on the cleaning task and the duration of application, cleaning solutions according to the present invention typically need not be used at temperatures higher than about 100° F. In most applications, the cleaning composition is safer to use than caustic cleaners. Unlike many caustic cleaners, the cleaning composition generally does not produce dangerous fumes and is not corrosive to skin. The cleaning composition also does not corrode or scar metals such as aluminum, stainless steel, and brass. In high temperature tank cleaning operations, the cleaning composition can release oxygen and thereby produces a counter-pressure which helps prevent tank collapse.

The cleaning composition has a number of other advantages relative to existing cleaners. In some applications, the cleaning composition provides an all purpose cleaner that can replace existing caustic and noncaustic cleaners. The cleaning composition thereby reduces the labor and time required to clean equipment. In some applications, the cleaning composition is environmentally benign. The release of oxygen by the composition facilitates compliance of the cleaning solution with the regulations regarding chemical and biological oxygen levels in waste water. The cleaning composition thereby often requires little or no treatment in primary waste water treatment facilities, as generally required by many existing cleaners. In some applications, the cleaning composition has a pH level acceptable to municipal waste water treatment facilities. In particular, a pH level between 9 and 12 is expected from the use of the present cleaning composition.

DETAILED DESCRIPTION

The present invention provides an alkaline cleaning composition for cleaning heavily soiled surfaces especially in the processing and storing of foods. The cleaning composition removes a wide range of foreign deposits, such as grease, protein, baked-on carbon and charred organics, and other types of organic and inorganic deposits and stains. The cleaning composition removes foreign deposits from a wide variety of objects such as food fryers, baking pans, high temperature pasteurizing equipment, beer kettles, ceramic china plates, platters, brass and aluminum filters, metal, ceramic or plastic parts and equipment, aluminum baking pans, carpets, fabrics, and the like.

In a preferred embodiment, the cleaning composition includes (a) a peroxygen compound, (b) a metasilicate and/or sesquisilicate, (c) a builder, and (d) a chelate. Preferably, the cleaning composition is substantially free of chlorine-containing compounds and hydroxides. The cleaning composition is typically in a dry, granulated form which is dissolved in a carrier, such as water, to form a cleaning solution before use. The cleaning solution can be applied by a mechanical sprayer, soak-tank, or other suitable technique. In a preferred embodiment, the cleaning solution is effective at temperatures of no more than about 190° F., and more preferably no more than about 100° F.

While not wishing to be bound by any theory, it is believed that the peroxygen compound and chelate react synergistically to remove most foreign deposits. The peroxygen compound releases oxygen molecules which break down bonds in the foreign deposit. The chelate reacts with and ties up dissolved metals in the water which would otherwise react with and neutralize the oxygen. It is further believed that the metasilicate and builder peptize or emulsify (e.g. solubilize) proteins or fat. The metasilicate and builder together provide sufficient alkalinity to saponify the high levels of fat in many foreign deposits.

The peroxygen compound preferably includes a perborate or a percarbonate and more preferably a percarbonate. The perborate or percarbonate can be complexed with a metal, preferably one selected from the group including sodium, lithium, calcium, potassium, and boron. The cleaning composition preferably includes at least about 25% by weight and more preferably from about 25% to about 40% by weight, and most preferably from about 25% to about 35% by weight, of the peroxygen compound. The metasilicate and sesquisilicate are preferably in the anhydrous form and are complexed with a metal selected from the group including sodium and potassium. The cleaning composition preferably includes at least about 15% by weight and more preferably an amount ranging from about 20% to about 40% by weight and most preferably from about 25% to about 35% by weight of the metasilicate and/or sesquisilicate.

The chelate is preferably a derivative of a carboxylic or phosphonic acid. More preferably, the chelate is selected from the group consisting of EDTA, NTA, and other derivatives of a carboxylic acid and phosphonic acid and derivatives of phosphonic acid, such as poly(alkylphosphonic acid) (e.g., sold under the trademark ACUSOL 505ND). The EDTA acid is preferably in the form of a salt, such as a sodium salt ("ETDA-Na$_4$") or a potassium salt, as the salt is more water soluble than the acid. The cleaning composition preferably includes at least about 2% by weight and more preferably an amount ranging from about 2% to about 8% by weight and most preferably from about 4% to about 6% by weight of the chelate, with the optimum amount being about 5% by weight.

In one embodiment, the peroxygen compound, metasilicate, and chelate are all salts having the same cation. More preferably, all of the salts in the cleaning composition have the same cation. The preferred cation is sodium or potassium.

The builder preferably includes at least a sulfate, a phosphate or a carbonate. The sulfate can be a sodium sulfate. The phosphate can be a tripolyphosphate, trisodium polyphosphate, sodium potassium pyrophosphate, sodium hexametaphosphate, disodium phosphate, monosodium phosphate, and mixtures thereof. The carbonate can be a sodium carbonate, sodium sesquicarbonate, sodium bicarbonate, and mixtures thereof. When the cleaning composition includes a surfactant, the carbonate and phosphate are preferably in the hydrated form, such as trona or soda ash.

While not wishing to be bound by any theory, it is believed that the hydrated builders, such as the hydrated phosphates and/or carbonates, form bonds with the surfactants which are hydrophilic substances, thereby immobilizing the surfactant and water. As will be appreciated, the surfactant and water will react with the peroxygen compound unless the surfactant and water are immobilized. The reaction reduces and therefore neutralizes the peroxygen compound while causing the release of oxygen gas. The reaction not only adversely impacts the shelf life and cleaning efficiency of the cleaning composition but also can cause a hazardous pressure build up from the released oxygen gas. The use of adequate amounts of hydrated builders has been found to substantially eliminate these problems.

The amount of hydrated builder in the cleaning composition depends upon the amount of surfactant in the cleaning composition. Preferably, the molar ratio of the hydrated builder to the surfactant is at least about 4 parts of hydrated builder to one part surfactant and more preferably ranges from about 6 to about 22 parts of hydrated builder to one part surfactant, and most preferably ranges from about 8 to about 10 parts of hydrated builder to one part surfactant. In most applications, the preferred amount of hydrated builder in the cleaning composition is at least about 20% by weight and more preferably ranges from about 25% to about 45% by weight of the cleaning composition.

The total amount of builder in the cleaning composition (both in the hydrated and anhydrous forms) varies depending upon the application. The cleaning composition preferably includes from about 20% to about 75% by weight and more preferably from about 20% to about 50% by weight of the builder.

It has been discovered that phosphate builders have several beneficial effects on the performance of the cleaning composition in addition to immobilizing the surfactant and water. The phosphate helps the chelate build up free metals and keep soils in suspension. In sufficient amounts, the phosphate has been found to have improved rinsibility and reduced streaking, and dry blending of the cleaning composition is much less difficult. Preferably, the cleaning composition contains from about 3% to about 15% by weight phosphates.

The ratios of the various components are important parameters in many applications. Preferably, the weight ratio of the peroxygen compound to the chelator ranges from about 3:1 to 7:1 and more preferably is about 6:1. The preferred weight ratio of the metasilicate and sesquisilicate to the surfactant preferably ranges from about 5:1 to about 15:1 and most preferably is about 9:1. The preferred weight ratio of the metasilicate and sesquisilicate to the peroxygen compound preferably ranges from about 1:1 to about 2:1 and is more preferably about 1:1. The preferred weight ratio of the metasilicate and sesquisilicate to the chelator preferably ranges from about 5:1 to about 15:1 and most preferably is about 6:1.

The cleaning composition can further include a surfactant, such as a wetting agent, emulsifying agent, or dispersing agent. The surfactant must be functional in an alkaline solution. Suitable surfactants are nonionic, anionic and amphoteric surfactants. Preferred nonionic surfactants include octylphenoxy-polyethoxy-ethanol (e.g., sold under the trademark TRITON X-100), nonyl phenoxy ethyleneoxy ethanol (e.g., sold under the trademark IGEPAL C0730), nonylphenoxypoly(ethyleneoxy) ethanol (e.g., sold under the trademark IGEPAL CO630), octylphenoxypoly (ethyleneoxy) ethanol (e.g., sold under the trademark IGEPAL 630), polyoxy ethoxylated ethanol (e.g., sold under the trademark RENEX ZO), glycol fatty esters (e.g., sold under the trademark HALLCO-376-N), fatty acid alkylanolamid (e.g, sold under the trademark ALKAMIDE 2110), cetyldimethyl amine oxide (e.g., sold under the trademark AMMONYX CO), aliphatic polyether (e.g., sold under the trademark ANTAROX LF-344), polyethylenated alkyl glycol amide (e.g., sold under the trademark ANTAROX G-200), fatty alcohol polyether (e.g., sold under the trademark AROSURE 63-PE-16), polyoxyethylene sorbitol esters of mixed fatty and resin acids (e.g., sold under the trademark ATLAS G-1234), modified oxyethylated straight-chain alcohol (e.g., sold under the trademark RENEX 648), modified oxyethoxylated straight-chain alcohols (e.g. sold under the trademark PLURAFAC RA.ZO), alkylaryl polyether (e.g., sold under the trademark TRITON CF10), trifunctional polyoxyalkylene glycols (e.g., sold under the trademark PLURADOT HA-410), diethylene glycol dioleate, polyethylene glycol recinaleate, polyethylene glycol dioleate, tridecyl alcohol, nonylphenol, and ethylene oxide condensation products that are based on propylene oxide-propylene glycol (e.g., sold under the trademark PLURONIC L-61), ethoxylated alkylphenols (e.g., sold under the trademarks IGEPAL RC-620, ALKASURF OP-12, and TRITON N-101), propoxylated and ethoxylated fatty acids, alcohols, or alkylphenols (e.g., sold under the trademarks TRITON XL-80N and ANTAROX BL-330), ethoxylated alcohols (e.g., sold under the trademarks PLURAFAC A, TRITON CF-54, TERGITOL TMN-6, and TERGITOL 15-5-7), alkoxylated linear aliphatic alcohol (e.g., sold under the trademark OLIN SL-42), and alcohol alkoxylate (e.g., sold under the trademark SURFONIC LF-17). Preferred anionic surfactants include ethoxylated (3 moles) phosphate ester (e.g., sold under the trademark TRITON QS-44), sodium sulfate of 2 ethyl-a-hexanol (e.g., sold under the trademark TERGITOL 08), sodium petroleum sulfonate (e.g., sold under the trademark PETRONATE K), sodium alkyl naphthahalene sulfonate (e.g., sold under the trademark PETRO AR, SELLOGEN K, NEKAL BX-78, ALKANOL B), primary alkane sulfonate (e.g., sold under the trademark BIO TERG PAS-8S), dioctyl ester of sodium sulfosuccinic acid (e.g., sold under the trademark ABRESOL OT), sodium alkylaryl sulfonate (e.g., sold under the trademark AHCOWET ANS), sodium salt of sulfated alkylphenoxy poly(ethyleneoxy) ethanol (e.g., sold under the trademark ALIPAL EO-526), sodium methyl n-oleyl-taurate (e.g., sold under the trademark AMATER G T), alkyl polyphosphate (e.g., sold under the trademark ATCOWET C2), sodium lauryl sulfate (e.g., sold under the trademark AVIROL 101), sodium N-methyl-N-tall oil acid taurate (e.g., sold under the trademark IGEPON TK-32), lauric alkyloamine condensate (e.g., sold under the trademark NOPCOGEN 14-L), fatty alcohol sulfate modified (e.g. sold under the trademark RICHOLOL 4940), modified diethanolamides of fatty acids (e.g., sold under the trademark SHERCOMID), sulfates of alcohols (e.g., sold under the trademark STANDOPAL LF), sulfonates of naphthalene and alkyl naphthalene (e.g., sold under the trademark PETRO WP) and alkanolamides (e.g., sold under the trademark NOPCO 1179). Preferred amphoteric surfactants include disodium N-tallow betamino dipropionate (e.g., sold under the trademark DERIPHATE 154), sodium derivative of dicarboxylic caprylic acid (e.g., sold under the trademark MIRANOL J2M, letithin (e.g., sold under the trademark CENTROL CA, LA), lauryl ampholytic (syndet) (e.g., sold under the trademark SCHERCOTERIC BASE 156), carboxylic acid derivatives of substituted imidazolines (e.g., sold under the trademark MONATERIC), complex coco betaine (e.g., sold under the trademark CARSONAM 3 AND 3147), fatty sulfobetaine (e.g., sold under the trademark LONZAINE CS), dicarboxylic coconut derivative triethanolamine (e.g., sold under the trademark MIRANOL TEA), dicarboxylic octoic derivative sodium salt (e.g. sold under the trademark MIRANOL JEM), dicarboxylic myristic derivative diethanolamine (e.g., sold under the trademark MIRANOL M2M-DEM), dicarboxylic myristic derivative monoethanolamine (e.g., sold under the trademark MIRANOL M2M-MEA), dicarboxylic myristic derivative sodium salt (e.g., sold under the trademark MIRANOL M2M-SF), dicarboxylic capric derivative diethanolamine (e.g., sold under the trademark MIRANOL S2M-DEA), imidazolnes and imidazline derivatives (e.g., sold under the trademark MONATERIC 949-J), dicarboxylic capric derivative triethanolamine (e.g., sold under the trademark MIRANOL S2M-TEA), and other amphoteric surfactants (e.g., sold under the trademark PHOSPHOTERIC T-C6).

More preferred surfactants include (i) the nonionic surfactants, nonylphenoxypoly(ethyleneoxy) ethanol (e.g., sold under the trademark IGEPAL CO630), octylphenoxypoly(ethyleneoxy) ethanol (e.g., sold under the trademark IGEPAL 630), ethoxylated alkylphenols (e.g., sold under the trademarks IGEPAL RC-620, ALKASURF OP-12, and TRITON N-101), propoxylated and ethoxylated fatty acids, alcohols, or alkylphenols (e.g., sold under the trademarks TRITON XL-80N and ANTAROX BL-330), ethoxylated alcohols (e.g., sold under the trademarks PLURAFAC A, TRITON CF-54, TERGITOL TMN-6, and TERGITOL 15-5-7), alkoxylated linear aliphatic alcohol (e.g., sold under the trademark OLIN SL-42), diethylene glycol dioleate, polyethylene glycol recinaleate, polyethylene glycol dioleate, tridecyl alcohol, nonylphenol, and ethylene oxide condensation products that are based on propylene oxide-propylene glycol (e.g., sold under the trademark PLURONIC L-61), and alcohol alkoxylate (e.g., sold under the trademark SURFONIC LF-17); (ii) the anionic surfactants, primary alkane sulfonate (e.g., sold under the trademark BIO TERG PAS-8S), sulfates of alcohols (e.g., sold under the trademark STANDOPAL LF), sulfonates of naphthalene and alkyl naphthalene (e.g., sold under the trademark PETRO WP), and alkanolamides (e.g., sold under the trademark NOPCO 1179); and (iii) the amphoteric surfactants, imidazolnes and imidazline derivatives (e.g., sold under the trademark MONATERIC 949-J), and the amphoteric surfactant sold under the trademark PHOSPHOTERIC T-C6.

Most preferred surfactants include the low foaming surfactants, primary alkane sulfonate sold under the trademark BIO TERG PAS-8S and propylene oxide and ethylene oxide block polymer sold under the trademark PLURONIC L-61 and the high foaming surfactants, nonylphenoxypoly (ethyleneoxy) ethanol sold under the trademark IGEPAL CO 630 and octylphenoxypoly(ethyleneoxy) ethanol sold under the trademark IGEPAL CA 630.

The amount of the surfactant in the cleaning composition is important to the effectiveness of the cleaning composition. Preferably, the cleaning composition contains at least about 2.5% by weight and more preferably from about 2.5% to about 8% by weight, and most preferably from about 2.5% to about 5% by weight of the surfactant.

The cleaning composition can also include a gelling agent to provide a gel formulation for applying the cleaning composition to soiled objects. The cleaning ability of the cleaning composition is facilitated by the adherence properties of the gel. For instance, such gel formulations are particularly useful for thick charred organic buildups on barbecue grills. Preferred gelling agents include carboxymethyl cellulose, hydroxymethylcellulose and modified polyacrylamide. The preferred concentration of the gelling agent in the cleaning composition ranges from about 6% to about 12% by weight.

To apply the cleaning composition with a gelling agent, the cleaning composition is preferably combined with from about 7 to about 14 parts by weight water and the mixture is placed in a pressurized vessel at about 160 psi. As the pressure is released, the mixture is ejected from the vessel onto the object to be cleaned. The mixture can include a foam builder such as nonylphenoxy polyethoxyethanol to enhance the foaming characteristics of the mixture.

The above-noted components of the cleaning composition are combined by suitable techniques for forming granulated cleaners. For example, the various components are added to a vessel as follows: (i) the various builders are added first, preferably in an anhydrous form, and blended together, (ii) the surfactant is added second and blended with the builders, (iii) water is added after or simultaneously with the surfactants and blended with the surfactants and builders for a sufficient period of time for substantially all of the water to form hydrates with the builder(s), (iv) the metasilicate and/or sesquisilicate, chelate, and peroxygen compound are added in that order, and (v) the gelling agent is added last. The various components can be blended with any suitable device. In the preceding steps, the peroxygen compound must be maintained separate from water and the surfactant as the peroxygen compound will react with water and/or the surfactant, thereby releasing oxygen and neutralizing the peroxygen compound. Thus, the surfactant must be added to the vessel before the peroxygen compound.

The addition of water in the third step must be carefully controlled. If too much water is added, the resulting cleaning composition will not be a free flowing particulate, as desired, but will be a highly viscous mass. If too little water is added, the surfactant may not be immobilized and can react with the peroxygen compound. Preferably, the minimum amount of water added is the stoichiometric amount that is sufficient to form hydrates with substantially all of the hydratable builders and the maximum amount of water added is no more than about 150% and more preferably no more than about 125% of the stoichiometric amount. By way of example, if sodium carbonate ($Na_2CO_3$) is the hydratable builder the molar ratio of sodium carbonate to water preferably ranges from about 50:1 to about 175:1 and most preferably from about 100:1 to about 150:1. In most applications, the molar ratio of hydratable builders to water also ranges from about 50:1 to about 175:1 and more preferably from about 100:1 to about 150:1, and the total amount of water added to the cleaning composition in the third step and total amount of water in the cleaning composition, whether occurring as free or hydrated molecules, ranges from about 0.1 to about 0.5% by weight of the final cleaning composition, with 0.1% by weight being most preferred. The free moisture content of the cleaning composition is preferably no more than about 0.1% by weight of the cleaning composition.

The blending time of the third step must also be carefully controlled to substantially minimize the amount of free water molecules present in the cleaning composition. The water/surfactant/builder blend must be blended for a sufficient period of time for the water to react with substantially all of the hydratable builders and for substantially all of the surfactant to form bonds with the hydrated builders. Preferably, the blending in the third step has a duration of at least about 5 minutes after water addition and more preferably ranging from about 5 to about 10 minutes.

As noted above, the cleaning composition is preferably a dry, granular material. Before use, the cleaning composition can be dissolved in water, or other suitable carrier, to form a cleaning solution. The preferred concentration of the cleaning composition in the cleaning solution is discussed below. The cleaning solution preferably has pH ranging from about pH 8 to about pH 12 and more preferably from about pH 10 to about pH 11.

The method for using the cleaning solution to remove organic deposits from an object will now be described. Before applying the steps described below, the various components of the cleaning composition are combined in the appropriate amounts and ratios to provide the cleaning composition.

In the first step, the cleaning composition is combined with water to form the cleaning solution and the cleaning solution applied to the object. The cleaning solution is applied to the object for a sufficient period of time to remove the foreign deposit. Preferably, the application is effectuated by soaking the object in the cleaning solution in a soak-tank or spraying the cleaning solution on the object. The soaking of the object can be accomplished by quiet soak or by circulating the cleaning solution about the object. The temperature of the cleaning solution is preferably no more than about 190° F., more preferably less than about 160° F., and most preferably less than about 120° F. Depending on the soil load, the time required to solubilize most foreign deposits into the cleaning solution is preferably no more than about 8 hours for soaking techniques and no more than about 2 hours for spraying techniques.

The concentration of the cleaning composition in the cleaning solution depends upon the type of foreign deposit and application technique. In most applications, the preferred aqueous concentration of the cleaning agent in the cleaning solution ranges from about 2 to about 8 percent by weight. For soak-tank applications, the cleaning solution more preferably contains from about 3% by weight of the cleaning composition for cleaning heavily soiled, carbonized baking pans; about 0.75% by weight of the cleaning composition (at 120° to 160° F.) for cleaning brewery kettles; about 3% by weight of the cleaning composition (at room temperature) for cleaning aluminum baking pans; about 3% by weight of the cleaning composition (above the boiling point) for cleaning deep fat fryers; about 2% by weight of the cleaning composition (at 140° F.) for cleaning china plates; about 2% by weight of the cleaning composition for cleaning objects having carbon or protein deposits; and as much as 5% by weight of the cleaning composition for cleaning other types of heavy soiled objects. For spray and other clean-in-place applications, the cleaning solution more preferably has a concentration of the cleaning composition ranging from about 0.25% to about 5% by weight. However, because of the pressure with which the cleaning solution is applied in these operations, a somewhat lower concentration may be used than for comparable cleaning required for mechanical soak-tank cleaning.

After the appropriate time, the cleaning composition is removed from the object. Typically, the cleaning solution is removed by rinsing the object with water. After removal, the cleaning solution typically has a pH ranging from about pH 9 to about pH 12.

EXAMPLES

The present cleaning composition will now be further described by reference to the following illustrative examples in which all references to "parts" and percentages are on a weight basis.

Example No. 1

For cleaning a deep fat fryer, an aqueous solution having a 2.4% by weight concentration of the present cleaning composition was placed in the deep fat fryer and allowed to sit at ambient room temperature without agitation for 8 hours. The solution was removed and the fryer rinsed with water. The deep fat fryer had over 90% of the carbon removed without scouring or rubbing of any kind. When compared against a standard caustic cleaner comprised of 80% by weight caustic soda, 15% by weight builder and 5% by weight surfactant, using the same soak time, temperature and concentration, only 40% of the carbon was removed. Furthermore, when the caustic cleaner was used at 190° F. for 4 hours at 2.4% by weight, the deep fat fryer was only 80% clean.

Example No. 2

For cleaning bakery pans, a solution having a 2.4% by weight concentration of the present cleaning composition was used for immersing aluminum bakery pans for 3½ hours at 120° F. The pans were initially covered with baked-on carbon from the commercial ovens as well as typical food soils and food stains. After the 3½ hour soak, all carbon and food soils were removed without agitation, scouring or rubbing. Note that no standard caustic cleaner could be used on the aluminum pans without major damage to the pans. Further note that normal silicated bakery pan cleaners will not remove carbon due to their lack of penetrating power.

In addition to the above examples, it has been determined that heavily soiled, carbonized baking pans at ambient room temperature can be effectively cleaned by soaking in a solution having a 3% by weight concentration of the present cleaning composition.

Example No. 3

For removing protein and beer stone deposits in a micro brewery, a solution having a 1% by weight concentration of the present cleaning composition was circulated about the deposits at 150° F. for 30 minutes. The cleaning effectiveness was compared against a standard liquid and a soda powder chlorinated caustic cleaner. In each case the present cleaning composition outperformed the caustic cleaners in protein and beer stone removal, at lower temperatures and in substantially less time (in most cases the time was ¼ to ⅓ of the normal time required for the caustic cleaners).

The two caustic cleaners (one a powder and one a liquid) against which the present cleaning composition was compared had the following ingredients:

|  | Powder (% by weight) | Liquid (% by weight) |
|---|---|---|
| Caustic Soda Beads | 30 | — |
| Caustic Soda Liquid 50% | — | 40 |
| Polymer (ACUSOL 44) | — | 6 |
| Sodium Tripolyphosphate | 25 | — |
| Soda Ash Dense | 29 | — |
| Sodium Hypochlorite | — | 20 |
| Sodium Dichloroisocyanurate | 3.0 | — |
| surfactant (PLURONIC 25R2) | 2.0 | — |
| Sodium Sulfate | 10.0 | — |
| Water | — | 28.0 |
| Potassium Silicate | — | 6.0 |

Further note that it has been determined that using a 0.5% by weight solution at 140° F. is effective for cleaning brewery kettles.

Example No. 4

For cleaning brass beer filters a solution having a 2% by weight concentration of the present cleaning composition was applied at 180° F. for 20 minutes to brass beer filters. The present cleaning composition removed all visible protein and charred organics which had accumulated from several years of beer processing. The normal cleaning agent used 3% by weight sodium hydroxide and was typically circulated for 2 hours. This process removed soils, but caused great corrosive and oxidation damage to the filters. The present cleaning composition did a better job at lower temperatures in less time and did not damage the filters. The calculated metal loss from corrosion was 11 ppm for the solution having the present cleaning composition as compared to 1,000 ppm when using the normal caustic cleaning agent.

Example No. 5

For cleaning barbecue grills, a solution having a concentration of 1 lb. of the present cleaning composition dissolved in 5 gallons of water was used. The barbecue grills, which were caked with grease and baked-on carbon, were soaked overnight in the solution at ambient room temperature. This resulted in 98% of all carbon and food soils being removed upon rinsing with a slight spraying action and with a slight rubbing of the grills. Almost no residue or evidence of the grease or carbon was visible in the waste water after soaking was complete. Note that the standard caustic cleaners had very little effect.

Example No. 6

For cleaning restaurant grade ceramic china, a solution having a concentration of 16 oz. of the present cleaning composition dissolved in 5 gallons of water was used. Restaurant grade ceramic china plates and platters were immersed in the solution for 3 hours at ambient room temperature. In everyday use these plates and platters are heated in an oven at 400° F. with steak and other red meat foods on them. The plates and platters are also placed directly on a heated grill surface that heats to over 500° F. The plates and platters were initially covered with baked-on carbon, grease and other food soils as well as discoloration stains. After the plates and platters were washed with conventional cleaners in a dishwasher and by hand scrubbing, they still were covered with brown and black spot stains and baked-on carbon. They had also become yellow in color instead of their original white. After the 3 hour soak in the solution of the present invention at ambient room temperature, the plates became clean and whitened.

Example No. 7

Standard clean-in-place procedures at a dairy includes mixing a caustic powdered cleaner in water at 185° F. and circulating the mixture through milk lines tanks and an high-temperature short-time pasteurizer for 45 minutes. The resulting waste water is discharged at a pH of 14. The caustic powdered cleaner had the following composition:

| Caustic Soda | 90.0% | by weight |
|---|---|---|
| Builder | 5.0% | by weight |
| Sodium Gluconate | 3.0% | by weight |
| Wetting Agent | 2.0% | by weight |

A solution having a concentration of 1 lb. of the cleaning composition dissolved in 5 gallons of water and heated to 185° F. was used in the same manner. That is, the solution was circulated for 45 minutes in the same manner as with the caustic cleaner. The cleaning results were far superior. All lines, valves and tanks were fully cleaned. Scalded areas that needed manual scrubbing after the caustic cleaning procedure were non-existent after circulating the solution having the present cleaning composition. Further, the high-temperature short-time pasteurizer had previously always required manual scrubbing and cleaning on its last 15 to 20 plates at the far end of the high temperature side of the press after each caustic cleaning. However, after the cleaning with the present cleaning composition, all plates including the very last one were fully cleaned. No manual scrubbing was required and the waste water discharge was pH 7 to pH 9.

As an aside, note that the high pH 14 of the caustic waste water discharged by the dairy when using the caustic powdered cleaner is unacceptable to local municipal waste water treatment facilities. However, a pH of pH 7 to pH 9 is acceptable.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A cleaning composition comprising:
   (a) from about 25% to about 40% by weight of a peroxygen compound;
   (b) from about 15% to about 35% by weight of at least one of a metasilicate or sesquisilicate; and
   (c) from about 2% to about 8% by weight of a chelate selected from the group consisting of ethylenediaminetetracetic acid, N-hydroxyethylenediaminetriacetic acid, and poly (alkylphosphonic acid), and mixtures thereof.

2. A cleaning composition as claimed in claim 1, wherein said peroxygen compound is at least one of a perborate or a percarbonate.

3. A cleaning composition as claimed in claim 1, wherein the ratio by weight of said peroxygen compound to said chelate ranges from about 3:1 to 7:1.

4. A cleaning composition as claimed in claim 1, wherein said at least one of a metasilicate or sesquisilicate is anhydrous.

5. A cleaning composition as claimed in claim 1, said cleaning composition being in the form of a free-flowing particulate, further comprising water, wherein the amount of said water ranges from about 0.1% to about 0.5% by weight of said cleaning composition.

6. A cleaning composition as claimed in claim 1, wherein said cleaning composition comprises from at least about 20% to about 45% by weight of a hydrated builder selected from the group consisting of a hydrated carbonate, a hydrated sulfate, a hydrated phosphate, and mixtures thereof.

7. A cleaning composition as claimed in claim 1, further comprising a surfactant, wherein said surfactant is from about 2.5% to about 5% by weight of said cleaning composition.

8. A free-flowing, particulate cleaning composition, comprising:
(a) a peroxygen compound;
(b) a hydrated builder selected from the group consisting of a hydrated carbonate, a hydrated sulfate, a hydrated phosphate, and mixtures thereof;
(c) a surfactant, wherein the hydrated builder retards the reduction of said peroxygen compound by said surfactant;
(d) an anhydrous builder that is an anhydrous counterpart to the hydrated builder;
(e) at least one of a metasilicate or sesquisilicate;
(f) a chelate having a different chemical composition than the anhydrous builder and hydrated builder and the at least one of a metasilicate or sesquisilicate; and
(g) water selected from the group consisting of free water, water of hydration, and mixtures thereof, wherein the total water content of the cleaning composition is from about 0.1 to about 0.5 wt %.

9. A cleaning composition as claimed in claim 8, wherein said cleaning composition comprises at least about 20% by weight of said hydrated builder.

10. A cleaning composition as claimed in claim 8, wherein said cleaning composition comprises from about 25% to about 45% by weight of said hydrated builder.

11. A cleaning composition as claimed in claim 8, wherein said hydrated builder is selected from the group consisting of the following compounds: sodium carbonate, sodium sesquicarbonate, sodium sulfate, sodium bicarbonate, tripolyphosphate, sodium potassium pyrophosphate, sodium hexametaphosphate, disodium phosphate, monosodium phosphate, and mixtures thereof.

12. A cleaning composition as claimed in claim 8, wherein the molar ratio of said hydrated builder to said surfactant is at least about 4:1.

13. A cleaning composition as claimed in claim 8, wherein the molar ratio of said hydrated builder to said surfactant ranges from about 6:1 to about 22:1.

14. A cleaning composition as claimed in claim 8, wherein said hydrated builder includes a phosphate and the cleaning composition includes from about 3% to about 15% by weight phosphate.

15. A cleaning composition as claimed in claim 8, wherein said surfactant is from about 2.5% to about 5% by weight of said cleaning composition.

16. A cleaning composition as claimed in claim 8, wherein the molar ratio of said hydrated builder to water ranges from about 50:1 to about 175:1.

17. A free-flowing, particulate cleaning composition, comprising:
(a) a hydrated builder selected from the group consisting of a hydrated carbonate, a hydrated sulfate, a hydrated phosphate, and mixtures thereof;
(b) an anhydrous builder that is an anhydrous counterpart of the hydrated builder;
(c) a peroxygen compound;
(d) a chelate having a different chemical composition than the anhydrous builder and hydrated builder; and
(e) at least one of a metasilicate or sesquisilicate.

18. The free-flowing, particulate cleaning composition of claim 17, wherein the total water content of the cleaning composition is from about 0.1 to about 0.5 wt %.

19. A free-flowing particulate cleaning composition, comprising:
(a) a peroxygen compound;
(b) at least one of an anhydrous metasilicate or anhydrous sesquisilicate;
(c) at least one of a hydrated metasilicate or hydrated sesquisilicate; and
(d) a chelate having a different chemical composition than the at least one of a hydrated metasilicate or hydrated sesquisilicate and the at least one of an anhydrous metasilicate or anhydrous sesquisilicate.

20. The free-flowing particulate cleaning composition of claim 19, wherein the total water content of the cleaning composition ranges from about 0.1 to about 0.5 wt %.

21. A free-flowing, particulate cleaning composition, comprising:
(a) a hydrated builder;
(b) a surfactant;
(c) an anhydrous builder that is an anhydrous counterpart of the hydrated builder;
(d) a peroxygen compound;
(e) at least one of a metasilicate or sesquisilicate;
(f) a chelate having a different chemical composition than the anhydrous builder and hydrated builder and said at least one of a metasilicate or sesquisilicate; and
(g) water selected from the group consisting of free water, water of hydration, and mixtures thereof, wherein the total water content of the free-flowing, particulate cleaning composition is no more than about 0.5% by weight.

22. A method for forming a free-flowing, particulate cleaning composition, comprising:
(a) contacting water, a surfactant, and an anhydrous builder to form an intermediate composition including a hydrated builder formed from at least a portion of the anhydrous builder wherein the duration of the contacting step (a) is sufficient for substantially all of said water to react with said anhydrous builder; and
(b) thereafter contacting said intermediate composition with a peroxygen compound, at least one of a metasilicate or sesquisilicate, and a chelate having a different chemical composition than the anhydrous builder and hydrated builder and the at least one of a metasilicate or sesquisilicate to form a free-flowing, particulate cleaning composition.

23. A method as claimed in claim 22, wherein the duration of the contacting step (a) ranges from about 5 to about 10 minutes.

24. A method as claimed in claim 22, wherein the contacting step (b) comprises:

(c) contacting said intermediate composition with said at least one of a metasilicate or a sesquisilicate to form a second intermediate cleaning composition;

(d) contacting said second intermediate cleaning composition with said chelate to form a third intermediate composition; and (e) contacting said third intermediate composition with said peroxygen compound to form said free-flowing, particulate cleaning composition.

25. A method as claimed in claim 22, wherein the contacting step (b) comprises:

(c) contacting said intermediate composition with said at least one of a metasilicate or sesquisilicate and said chelate to form a second intermediate cleaning composition; and (d) contacting said second intermediate cleaning composition with said peroxygen compound to form said free-flowing, particulate cleaning composition.

26. A method as claimed in claim 22, wherein in the contacting step (a) the molar ratio of hydrated builder to water ranges from about 50:1 to about 175:1.

27. A method as claimed in claim 22, wherein the cleaning composition comprises no more than about 0.1% by weight free water molecules.

28. A method for forming a free-flowing particulate cleaning composition, comprising:

(a) contacting water, a surfactant, and an anhydrous builder to form an intermediate composition including a hydrated builder formed from the anhydrous builder; and (b) thereafter contacting a peroxygen compound, at least one of a metasilicate or sesquisilicate, and a chelate having a different chemical composition than the anhydrous builder and hydrated builder with said intermediate composition to form a free-flowing, particulate cleaning composition.

* * * * *

UNITED STATES PATENT AND TRADEMARK OFFICE
CERTIFICATE OF CORRECTION

PATENT NO.   : 5,789,361
DATED        : August 4, 1998
INVENTOR(S)  : Charles Bullick Talley It is certified that error appears in the above-indentified patent and that said Letters Patent is hereby corrected as shown below:

In claim 1, line 1, after "A", please insert --free-flowing, particulate--.

In claim 5, lines 2-3, please delete "being in the form of a free-flowing, particulate,".

Signed and Sealed this

Sixteenth Day of November, 1999

Attest:

Q. TODD DICKINSON

*Attesting Officer*   *Acting Commissioner of Patents and Trademarks*